US012694867B2

(12) United States Patent
Golstein et al.

(10) Patent No.: US 12,694,867 B2
(45) Date of Patent: Jul. 28, 2026

(54) TECHNIQUES FOR IMPROVED AUDIO PROCESSING USING COMBINATIONS OF CLIPPING ENGINES AND ACOUSTIC MODELS

(71) Applicant: GONG.io Ltd., Ramat Gan (IL)

(72) Inventors: Eduard Golstein, Petah Tiqwa (IL); Eilon Reshef, Tel Aviv (IL); Zeev Rannon, Yehud (IL)

(73) Assignee: GONG.io Ltd., Ramat Gan (IL)

( * ) Notice: Subject to any disclaimer, the term of this patent is extended or adjusted under 35 U.S.C. 154(b) by 459 days.

(21) Appl. No.: 18/052,789

(22) Filed: Nov. 4, 2022

(65) Prior Publication Data

US 2024/0153493 A1       May 9, 2024

(51) Int. Cl.
*G10L 15/06* (2013.01)
*G10L 15/02* (2006.01)
(52) U.S. Cl.
CPC ............. *G10L 15/063* (2013.01); *G10L 15/02* (2013.01)
(58) Field of Classification Search
CPC .............................. G10L 15/063; G10L 15/02
See application file for complete search history.

(56) References Cited

U.S. PATENT DOCUMENTS

| | | | |
|---|---|---|---|
| 7,577,263 B2 | 8/2009 | Tourwe | |
| 11,270,688 B2 | 3/2022 | Lu et al. | |
| 12,033,615 B2 * | 7/2024 | Zhao | ...................... G10L 15/063 |
| 2007/0136050 A1 | 6/2007 | Tourwe | |

| | | | |
|---|---|---|---|
| 2011/0125500 A1 * | 5/2011 | Talwar | ................... G10L 17/26 |
| | | | 704/251 |
| 2021/0295829 A1 * | 9/2021 | Noel | ...................... G06F 40/279 |
| 2022/0360668 A1 * | 11/2022 | Brink | ...................... G10L 15/22 |

FOREIGN PATENT DOCUMENTS

WO        20200224217 A1      11/2020

OTHER PUBLICATIONS

Christoph Daube, et al. "Simple Acoustic Features Can Explain Phoneme-Based Predictions or Cortical Responses to Speech". Current Biology 29, 1924-1937. e1-e9, Jun. 17, 2019. (Available at https://www.ncbi.nlm.nih.gov/pmc/articles/PMC6584359/).
Jiahong Yuan, et al. "The Role of Phonetic Units in Speech Recognition". Aug. 2, 2021. (Available at https://arxiv.org/pdf/2108.01132v1.pdf#page=1).
Manohar, Vimal et al., "A Teacher-Student Learning Approach for Unsupervised Domain Adaptation of Sequence-Trained ASR Models", 2018 (available at http://danielpovey.com/files/2018_sit_teacher_student.pdf) (last accessed Sep. 21, 2022, at 5:20 PM).

* cited by examiner

*Primary Examiner* — Bhavesh M Mehta
*Assistant Examiner* — Eunice Lee

(57) ABSTRACT

A system and method for audio processing. A method includes training an acoustic model over a plurality of training iterations by, at each of the plurality of training iterations: applying the acoustic model to features extracted from training audio data in order to output a set of acoustic model predictions; applying a language model to at least a set of key term sample data in order to output a set of language model predictions, wherein the key term sample data demonstrates use of a plurality of key terms; clipping the training audio data into a plurality of clips based on the acoustic model predictions and the language model predictions; and tuning the acoustic model via a machine learning algorithm using the plurality of clips.

18 Claims, 6 Drawing Sheets

S320

Start

S410

Obtain sample audio data

S420

Obtain features from sample audio data

S430

Generate acoustic model predictions

S440

Decode speech in sample audio data

S450

Generate recognition language model predictions

S460

Generate clipping language model predictions

End

TECHNIQUES FOR IMPROVED AUDIO PROCESSING USING COMBINATIONS OF CLIPPING ENGINES AND ACOUSTIC MODELS

TECHNICAL FIELD

The present disclosure relates generally to audio processing, and more particularly to audio processing of speech content containing subject-specific key terms.

BACKGROUND

Audio processing, and particularly processing of audio content including speech, is a critical component to any computer-implemented speech recognition program used for understanding and acting upon words said during conversations. Various solutions for processing speech content exist. In particular, several solutions utilize one or more models for purposes such as recognizing the language being spoken during a conversation, the sounds being made, and more. To this end, automated speech recognition systems often include components such as an acoustic model and a language model (e.g., a language identification model).

An acoustic model typically handles analysis of raw audio waveforms of human speech by generating predictions for the phoneme (unit of sounds) each waveform corresponds to. The waveforms analyzed by the acoustic model are extremely nuanced. Not only can they be based on actual sounds produced by a given speaker, but they can also be influenced by background noise from the environment in which the sounds are captured. The language model makes predictions related to the structure of language such as, for example, probabilities for certain sequences of words. In particular, a language identification model may be used to predict the language being spoken based on the structure of the grammar within the analyzed speech content.

A particular challenge in processing speech content lies in identifying key terms within speech such as sales jargon or other known terms specific to certain subject matter. Historically, human operators who are subject matter experts would listen to calls and transcribe words spoken to the calls using their knowledge of the subject-specific key terms to help inform them of which words were being spoken.

However, this way of transcribing speech content including subject-specific key terms is not capable of processing speech in real-time, thereby limiting its application. Further, the accuracy of any resulting transcripts can vary due to human error and/or differences in expertise of the transcribers. That is, different transcribers may arrive at inconsistent transcriptions in part due to their own personal experiences and their subjective evaluations of the speaker's accent, tenor, tone, and the like. Moreover, manual transcription requires some degree of subjective judgment regarding which terms "sound" like subject-specific key terms as well as whether they appear to be used as key terms rather than using their ordinary meaning in the context of the conversation. The result is that transcription of speech content and, particularly, speech content including subject-specific key terms, tends to produce inconsistent results.

A further challenge in transcribing speech content including subject-specific key terms comes when there are two languages spoken in a given conversation, typically referred to as code switching. In this case, a part of a conversation in one language may interject a few words in the other language or in a completely different language. For example, a conversation that is part in German and part in French may include some subject-specific key terms related to business in English. This further complicates manual transcription.

Additionally, the challenges which must be overcome to automate this transcription are not trivial. Naïve application of an algorithm designed to determine the language being spoken in a certain portion of speech content is often insufficient to accurately determine the language for any given word, and would be incapable of identifying subject-specific key terms. More complex speech recognition algorithms could be created to analyze words from multiple different languages at once (i.e., analyzing each spoken word with respect to each potential language from among multiple potential languages), but processing words with respect to multiple different languages in this manner would require significantly more processing power and would take longer to process in order to obtain comparable results.

Further, even using such a more advanced model, that model may still fail to accurately recognize speech in some circumstances such as when subject-specific key words include the same acoustics as other words which are not subject-specific, or due to differences in waveforms which might be caused by differences between speakers, accents, speech patterns, or errors made in pronouncing words. The differences in waveforms and their effects on automated speech recognition therefore presents not just a challenge in modeling, but also in signal processing. The challenges in signal processing may be exacerbated when the speaker is switching back-and-forth between languages, where pitches and timbres of sounds produced by a speaker may change suddenly.

Additionally, acoustic models may be trained to make predictions of acoustics using machine learning techniques. Although using machine learning to create acoustic models provide promising new ways to produce accurate acoustic predictions, training a machine learning model to make accurate predictions typically requires a large amount of training data. When attempting to tailor an acoustic model for a specific purpose (e.g., to detect acoustics related to particular key terms), a suitable amount of audio data related to that purpose may not be readily available. In such a case, a person seeking to train an acoustic model may seek out publicly available data (e.g., data available via the Internet). However, such publicly available data may be unsuitable quality. In such cases, poor quality data cannot be used to train the acoustic model or else the acoustic model's predictions will be very inaccurate.

Solutions which improve the processing of speech content, particularly of speech content containing subject-specific key terms, are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for audio processing. The method comprises: training an acoustic model over a plurality of training iterations by, at each of the plurality of training iterations: applying the acoustic model to features extracted from training audio data in order to output a set of acoustic model predictions; applying a language model to at least a set of key term sample data in order to output a set of language model predictions, wherein the key term sample data demonstrates use of a plurality of key terms; clipping the training audio data into a plurality of clips based on the acoustic model predictions and the language model predictions; and tuning the acoustic model via a machine learning algorithm using the plurality of clips.

Certain embodiments disclosed herein also include a non-transitory computer readable medium having stored thereon causing a processing circuitry to execute a process, the process comprising: training an acoustic model over a plurality of training iterations by, at each of the plurality of training iterations: applying the acoustic model to features extracted from training audio data in order to output a set of acoustic model predictions; applying a language model to at least a set of key term sample data in order to output a set of language model predictions, wherein the key term sample data demonstrates use of a plurality of key terms; clipping the training audio data into a plurality of clips based on the acoustic model predictions and the language model predictions; and tuning the acoustic model via a machine learning algorithm using the plurality of clips.

Certain embodiments disclosed herein also include a system for audio processing. The system comprises: a processing circuitry; and a memory, the memory containing instructions that, when executed by the processing circuitry, configure the system to: train an acoustic model over a plurality of training iterations, wherein the system is further configured to, at each of the plurality of training iterations: apply the acoustic model to features extracted from training audio data in order to output a set of acoustic model predictions; apply a language model to at least a set of key term sample data in order to output a set of language model predictions, wherein the key term sample data demonstrates use of a plurality of key terms; clip the training audio data into a plurality of clips based on the acoustic model predictions and the language model predictions; and tune the acoustic model via a machine learning algorithm using the plurality of clips.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

4

Figure 6:
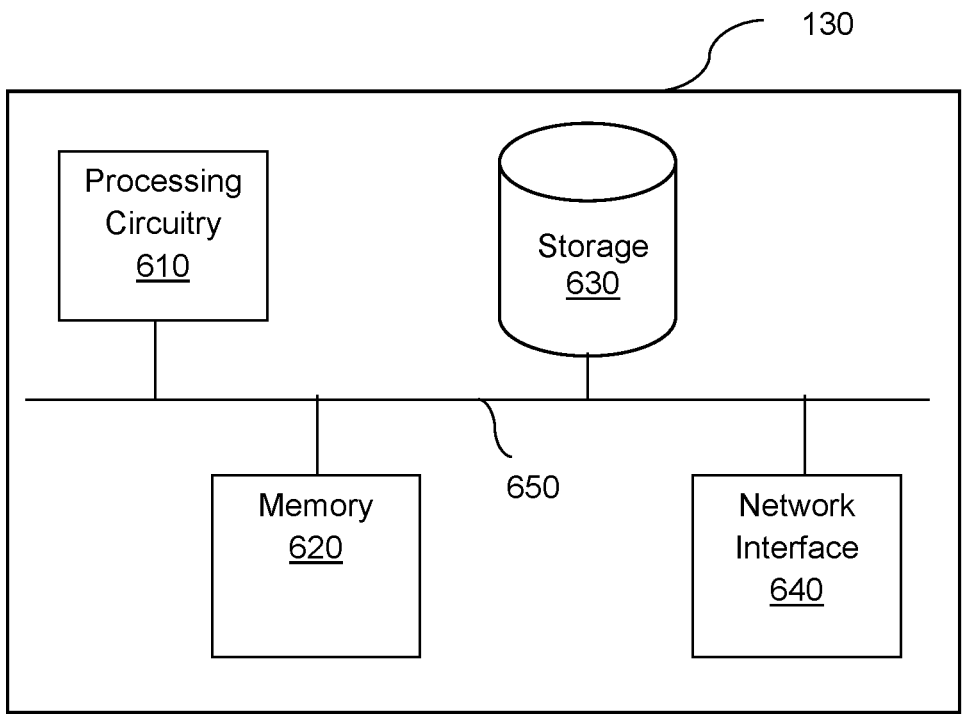

FIG. 6 is a schematic diagram of a hardware layer of an audio processor according to an embodiment.

DETAILED DESCRIPTION

The various disclosed embodiments provide improved techniques for processing audio content and, in particular, audio content containing speech. More particularly, the disclosed embodiments provide robust processing that yields accurate predictions of acoustics customized for sets of subject-specific key terms. Further, the disclosed embodiments demonstrate improved audio processing with respect to such key terms in a manner that is resilient to potential changes in language during a conversation.

To this end, the disclosed embodiments include techniques for improved speech processing including processes for training acoustic models using outputs of the clipping engine during training of the acoustic model such that the acoustic model is trained uniquely to audio clips output by the clipping engine. The disclosed techniques further include methods for using the results of the improved acoustic models in order to improve accuracy of automated speech recognition techniques using outputs of such acoustic models. The disclosed embodiments also provide various techniques which allow for training the acoustic model using a limited set of key term sample data along with a larger volume of unknown quality data which may therefore be utilized to overcome the challenge of insufficient available manually transcribed data of a suitable quality.

In an embodiment, a training process includes training an acoustic model using at least key term audio clips output by a clipping engine configured using a set (e.g., a list) of key terms in order to produce an acoustic model that is trained to recognize acoustics that are specific to the set of key terms. To this end, the clipping engine is applied to outputs generated using sample audio content in order to produce a set of clips, at least some of which are key term clips containing instances of key terms. The acoustic model is trained using the key term clips via one or more machine learning techniques (e.g., wav2vec2 finetune using Connectionist Temporal Classification).

Once the acoustic model is trained, a set of audio content to be processed using the acoustic model is obtained. The acoustic model is applied to obtained audio content in order to yield sets of acoustic predictions. The output of the acoustic model may, in turn, be input to a speech recognition decoder as part of a process for determining the words spoken in the audio content. The words determined by the speech recognition model may be sent for subsequent processing such as, for example, capitalization and punctuation.

The clipping engine is configured using a set of key terms such that the clipping engine is configured to output at least key term clips, which are audio clips containing key terms from the set. The set of key terms may be a predetermined list, or may be generated based on a language model related to a subject of interest. For example, the key terms may be identified as words or combinations of words which appear in the key term sample data above a threshold, and the list of key terms may include all key terms identified this way.

The disclosed embodiments provide acoustic models which exhibit improved accuracy when processing audio content related to particular subject matter. Moreover, the disclosed embodiments provide an objective, rules-based process involving specific steps related to particular models when applied to audio content which produces consistent results (i.e., applying the disclosed techniques to comparable audio content will yield comparable results). The disclosed embodiments include techniques for manipulating interactions between machine learning models which yield more accurate results than applying an acoustic model trained without these interactions.

Additionally, in various embodiments, the key term clips are used for training of the acoustic model in combination with target domain sample audio data of the domain to be used by the acoustic model. In this regard, it is noted that the highest improvement of recognition results by the acoustic model is realized when the acoustic model is trained using data from the same domain used in recognition (e.g., inference, channel (e.g., telephone, voice over Internet protocol) system, conference service provider, etc.), language context, and the like. However, such data may not be readily available, and requires extensive manual labor to produce.

In light of the challenges noted above, it has been identified that ample data is publicly available, for example via the Internet, for training acoustic models, but that much of the publicly available data is poor quality or otherwise unsuitable for use. Moreover, even when such publicly available data is of suitable quality, the data may not be in the target domain, i.e., the acoustic environment and language domain among that data may not belong to the target acoustic environment and language domain. The disclosed embodiments provide techniques that also allow for leveraging the vast amount of untranscribed data accessible via various sources like the Internet. More specifically, the clips created as discussed herein are created by a clipping engine configured based on key term samples and lists of key terms such that the clips it produces demonstrate audio of those key terms. Those clips can be used in combination with some amount of manually transcribed data from the target domain in order to fine tune the acoustic model to more accurately produce recognition results in this domain.

Figure 1:
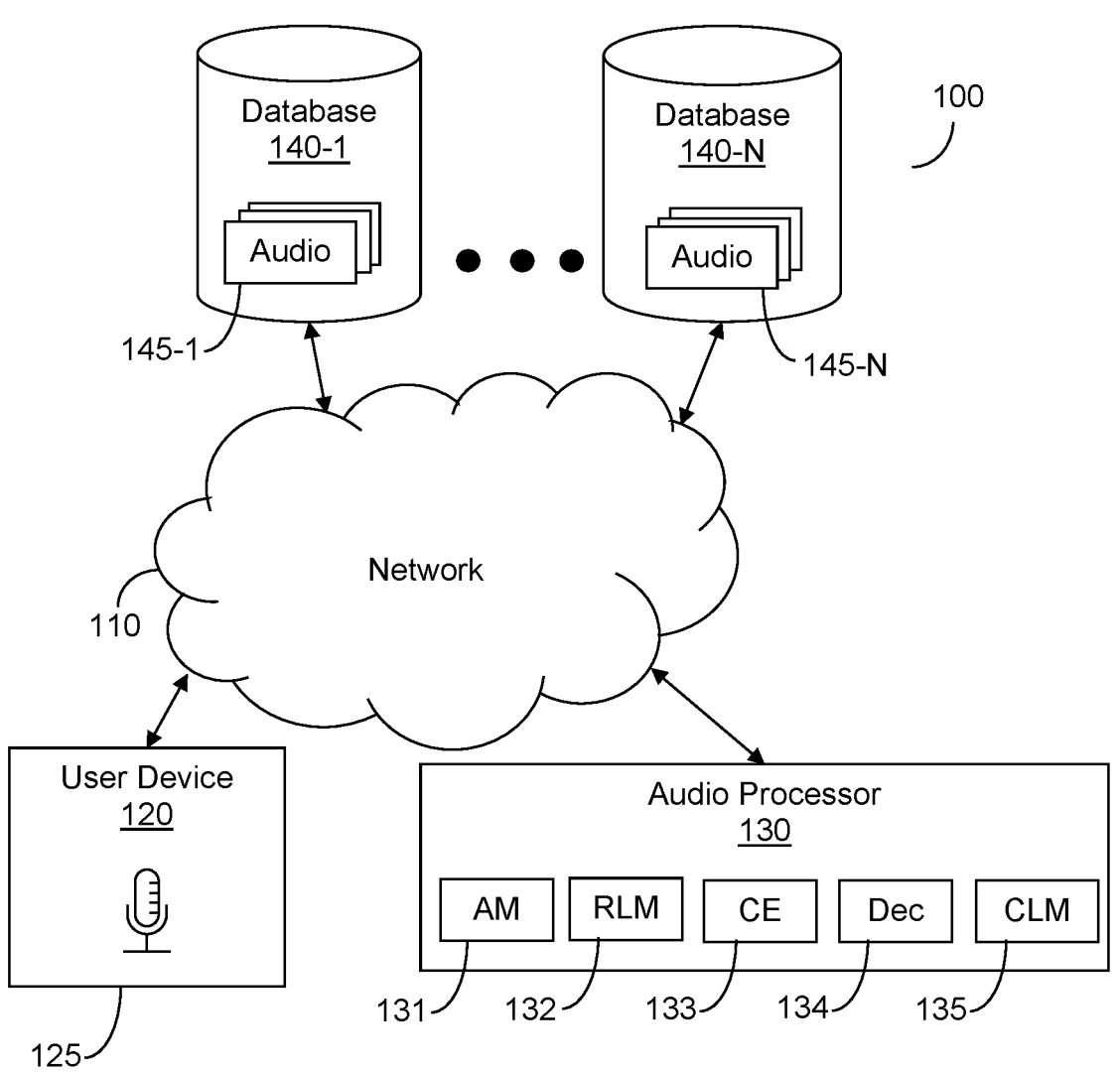
FIG. 1 is a network diagram utilized to describe various disclosed embodiments.

FIG. 1 shows an example network diagram 100 utilized to describe the various disclosed embodiments. In the example network diagram 100, a user device 120, an audio processor 130, and a plurality of databases 140-1 through 140-N (hereinafter referred to individually as a database 140 and collectively as databases 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving speech recognition outputs and utilizing those outputs for one or more user-facing functions. As non-limiting examples, the user device 120 may be configured to use speech recognition outputs for speech-to-text functions (e.g., for closed captioning or speech-to-text logging), for voice-activated commands (e.g., commands to a virtual agent or a self-driving vehicle), for voice-based authentication, combinations thereof, and the like.

The user device 120 may be further equipped with one or more input/output (I/O) devices and, in particular, audio-based I/O devices such as one or more microphones 125. The microphones 125 may be used to capture audio content containing speech (i.e., speech spoken by a user of the user device 120 or by others within capturing range of the microphones) in order to provide the audio processor 130 with audio content to be processed in accordance with the disclosed embodiments.

In an embodiment, the audio processor 130 is configured to process audio content (for example, audio content captured by the microphone 125 of the user device 120) in accordance with one or more of the disclosed embodiments. To this end, the audio processor 130 may store any or all of an acoustic model (AM) 131, a first recognition language model (RLM) 132, a clipping engine (CE) 133, a decoder (Dec) 134. and a second clipping language model (CLM) 135. In some embodiments, the audio processor 130 is configured to train at least the acoustic model 131, and may be further configured to train the speech recognition model 135. In particular, in accordance with various disclosed embodiments, the audio processor 130 may be configured to fine tune the acoustic model 131 using outputs of the clipping engine 133 in order to produce an acoustic model that more accurately identifies acoustics in speech content.

The recognition language model 132 applied during recognition is trained to output a probability of text in a given portion of surrounding text context. Outputs of the recognition language model 132 may be utilized in tandem with outputs of the acoustic model 131, for example by inputting them to the clipping engine 133 in order to produce clips which may be used in order to fine tune the acoustic model 131. To this end, each of the acoustic model 131 and the recognition language model 132 may be applied in order to produce a respective set of predictions (i.e., a set of acoustic model predictions with respective scores and language model predictions with respective scores) to be input to the clipping engine 133.

More specifically, the acoustic model 131 is applied to audio content such as, but not limited to, audio content 145-1 through 145-N stored in respective databases among the databases 140. The audio content 145 includes manually transcribed and untranscribed audio content containing speech, some of which is example audio content including subject-specific key terms and other of which may be audio content with unknown speech (e.g., audio from unverified sources such as the Internet and which may or may not contain the subject-specific key terms represented in the example audio content).

Initial training of the acoustic model 131 may be performed using manually transcribed data. At a pretraining stage (e.g., unsupervised pretraining), the acoustic model 131 may be configured using unsupervised audio content.

While training and fine tuning existing acoustic model 131, predictions are generated by applying the acoustic model 131 to untranscribed training audio content (e.g., audio content among the audio content 145). Output of the acoustic model 131 may be combined in decoder 134 with output of the recognition language model 132 in order to produce output text. The clipping engine 133 processes the text output by the decoder 134. The clipping engine 133 may use the scores output by the acoustic model 131, the scores output by the recognition language model 132, and the scores output by the clipping language model 135 in order to create a set of audio clips (not shown) including at least key term clips containing audio demonstrating speech with key terms. More specifically, in accordance with various disclosed embodiments, the clipping engine 132 is trained to output clips containing key terms such that different clips are output for different instances of key words. The clips output by the clipping engine 132, or features extracted therefrom, are input to a machine learning algorithm used for training or fine tuning the acoustic model 131 thereby improving the accuracy of the acoustic model 131.

In various implementations, the language models 132 and 135 may be configured differently in accordance with their respective roles relative to the training of the acoustic model 131. In an example of such an implementation, the recognition language model 132 is light enough to work in inference while producing as many predictions as possible in a given time period, while the clipping language model 135 is a heavier model that is trained to rescore or otherwise correct predictions output by the decoder 134.

An example illustration of potential interactions between and among various components of the audio processor 130 during training of the acoustic model 131 is described further below with respect to FIG. 6.

It should be noted that the user device 120 and the audio processor 130 are depicted as separate entities for the sake of discussion, but that at least a portion of the functions performed by the audio processor 130 may be performed by the user device 120 and vice versa without departing from the scope of the disclosure.

For example, the user device may be configured to apply the acoustic model 131, the language model 132, the clipping engine 133, the decoder 134, the speech recognition model 135, or a combination thereof, in order to process the speech captured via the I/O devices 125 rather than sending such audio content for processing from the user device 120 to the audio processor 130, and the audio processor 130 may be configured to train the acoustic model 131 using output clips from the clipping engine 133 as described herein.

Likewise, the user device 120 may be configured to capture and send audio content to the audio processor 130, and the audio processor 130 may be further configured to perform one or more of the functions that utilize the outputs of the speech recognition model 135, and the results of such functions may be sent to the user device 120 for subsequent use or processing. As yet another example, the audio processor 130 may be configured to apply the acoustic model 131 and the clipping engine 133 in combination, and the user device 120 may have stored thereon the speech recognition model 135 for use in speech recognition based on outputs of the models 131 and 132 provided by the audio processor 130.

Figure 2:
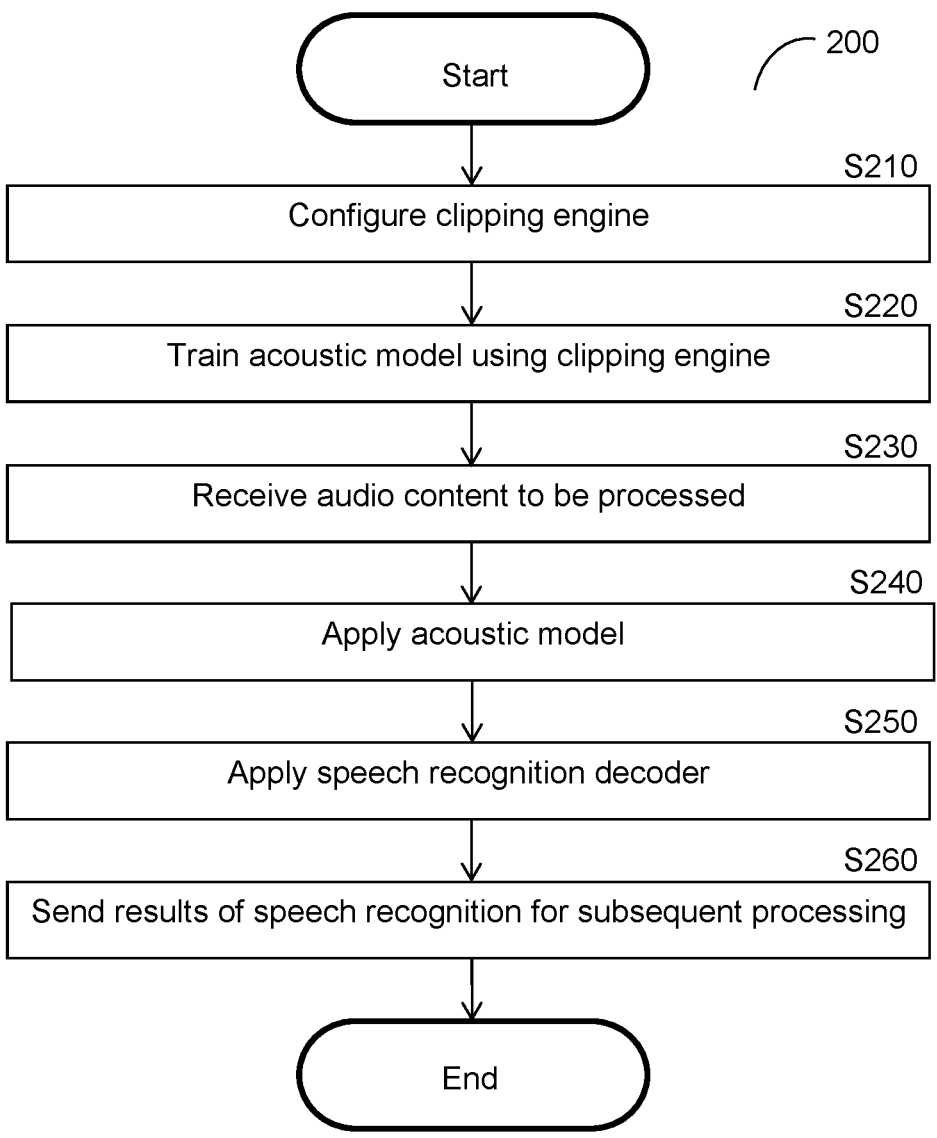
FIG. 2 is a flowchart illustrating a method for performing speech recognition using a clip-trained acoustic model according to an embodiment.

FIG. 2 is a flowchart 200 illustrating a method for speech recognition using a clip-trained acoustic model according to an embodiment. In an embodiment, the method is performed by the audio processor 130, FIG. 1.

At S210, a clipping engine is configured. The clipping engine is configured based on a list of key terms for a particular use. To this end, S210 may further include receiving such a list of key terms or generating the list of key terms based on audio samples related to the same subject. The clipping engine is configured to output audio clips based on audio content, with at least some of those audio clips being key term audio clips containing audio of respective key terms.

The key terms may include, but are not limited to, subject-specific words or combinations of words which represent particular concepts that are either unique to a specific subject matter or otherwise might have a unique meaning within that subject matter. Such key terms typically appear with particularly high frequency in audio content containing speech about the relevant subject matter relative to at least some other words. As a non-limiting example, the key terms may include jargon (i.e., terms used by a particular professional or occupational group) such as business, legal, technical, medical, or other jargon. It has been identified that, by isolating key terms within audio content and using those isolated portions of the audio content containing key terms to train an acoustic model, the acoustic model may be trained to specialize in identifying acoustics for those key terms, which allows for improving accuracy of the predictions made by the acoustic model and may allow for reducing the amount of processing to be performed by the acoustic model when analyzing portions of audio containing certain key terms.

At S220, an acoustic model is trained in combination with the clipping engine. More specifically, the acoustic model is tuned using outputs of the clipping engine such that the acoustic model becomes trained to predict acoustics with respect to key term clips output by the clipping engine. Because the clipping engine is configured using a list of key terms to output key term clips, training the acoustic model in combination with the clipping engine using the key term clips allows for further improving the processing of the audio in order to determine acoustics. In an embodiment, the acoustic model is trained as described further below with respect to FIGS. 3 and 4.

By clipping sample audio content into clips featuring key terms and then fine tuning the acoustic model using those portions, the accuracy of the acoustic model is improved. Additionally, the key terms used to configure the clipping engine may be tailored to a given subject, and may further be tailored to key terms commonly used by a particular entity (e.g., a customer). Thus, the clipping and acoustics processing may be tailored for a particular implementation in order to allow for effective automation of acoustics processing for different users without requiring manual transcribers or explicit programming of the models for the relevant set of key terms. Further, the clips may be created based on audio content of unknown quality and/or domain. Consequently, the large amount of unknown quality transcribed data available via sources such as the Internet may be leveraged to train the acoustic model with minimal (if any) loss in accuracy.

Specifically, parameters such as weights of the acoustic model may be learned via the training such that the acoustic model is configured to output probabilities representing potential acoustics in respective audio clips. At various iterations of the training, the acoustic model and, in particular, the weights of the acoustic model, may be fine tuned using the clips as inputs to the fine tuning process.

At S230, audio content to be processed is received. The received audio content at least includes speech content and, in particular, speech content which might include key terms.

At S240, the acoustic model is applied to the received audio content. The acoustic model outputs a set of predictions for potential acoustics in the received audio content. In an embodiment, S240 may further include applying one or more other models used for audio processing such as, but not limited to, a decoder and a language model. These other models may be applied to inputs including or otherwise determined based on the predictions output by the acoustic model.

At S250, a speech recognition decoder is applied based on the outputs of the acoustic model. The speech recognition model is designed to identify spoken words based on acoustics identified within the audio content. In an embodiment, S250 may include applying one or more automated speech recognition (ASR) techniques such as, but not limited to, Connectionist Temporal Classification (CTC), Hidden Markov models (HMMs), dynamic time warping (DTW), deep learning ASR algorithms, combinations thereof, and the like.

At S260, the results of applying the speech recognition model are output as recognized speech and sent for subsequent processing. The subsequent processing may include, but is not limited to, modifying the speech recognition outputs (e.g., reformatting, cleaning, or otherwise adjusting the outputs for later use), providing the speech recognition outputs to a model or program which utilizes speech outputs (e.g., for speech-to-text processing or other uses), both, and the like. To this end, the outputs of the speech recognition process are provided as inputs to one or more processes for subsequent processing. In some implementations, the outputs of the speech recognition may be sent to one or more systems (e.g., the user device 120, FIG. 1) configured for such subsequent processing.

In some embodiments, S260 further includes utilizing the outputs for one or more subsequent processing steps such as, but not limited to, creating text (e.g., for a speech-to-text program), providing words identified among the recognized speech as inputs to a decision model (e.g., a model for determining which actions to take based on user inputs in the form of spoken words), and the like. To this end, in such embodiments, S260 may include applying models or programs configured to perform such subsequent processing to the outputs of the speech recognition or to features extracted from those outputs in order to perform the subsequent processing.

Figure 3:
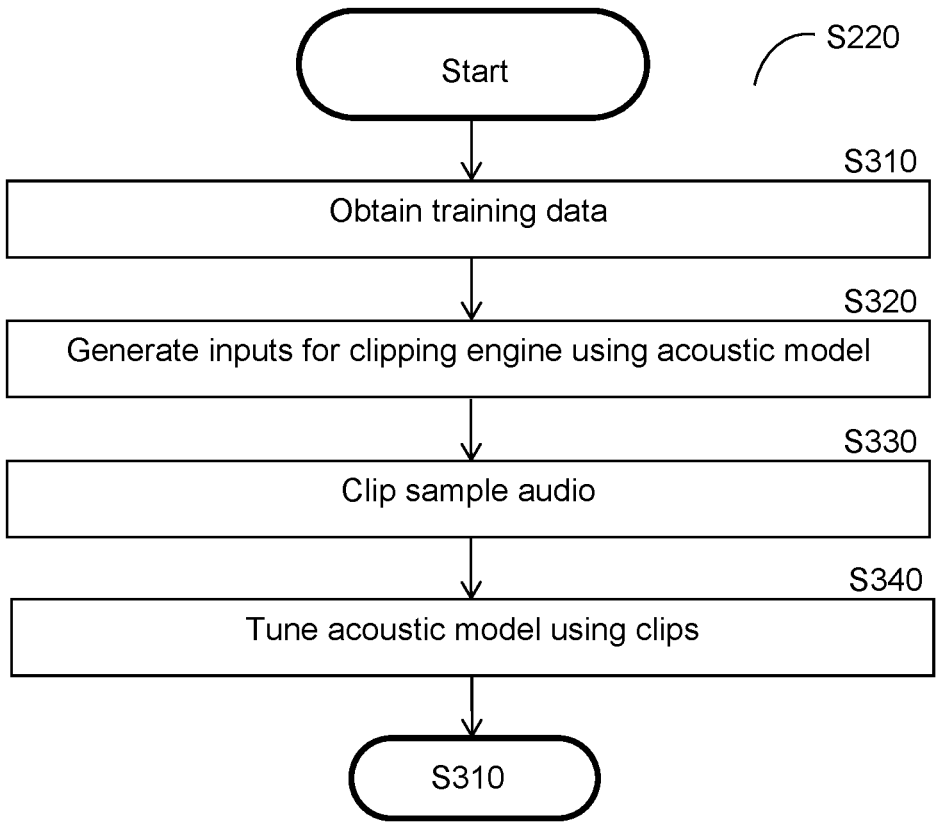
FIG. 3 is a flowchart illustrating a method for training an acoustic model using clips according to an embodiment.

FIG. 3 is a flowchart S220 illustrating a method for training an acoustic model using clips according to an embodiment.

At S310, training data to be used during training of the acoustic model is obtained. The training data includes, but is not limited to, unknown domain sample audio data (which may be of unknown quality) and key term data. The training data may further include manually transcribed data such as, but not limited to, public transcripts, target domain transcript data, entity-specific domain transcript data, combinations thereof, and the like.

The unknown domain sample audio data may or may not be in a domain (i.e., a universe of potential values) used by the acoustic model. As noted above, the disclosed embodiments allow for leveraging the large value of data available in order to train the acoustic model to make accurate predictions regardless of whether that the obtained data is originally in the domain used by the acoustic model. The sample audio data may include portions of audio such as frames containing words spoken by individuals.

The key term data reflects subject-specific key terms that the acoustic model should be customized for, and may be realized as a list of key terms, as content demonstrating use of key terms, or a combination thereof. Such key term content may be in forms such as, but not limited to, audio content containing spoken words including key terms, textual content including text demonstrating key terms, visual content depicting words including key terms, combinations thereof, and the like. The key term data may relate to a particular subject or, more specifically, to a particular subject for a particular entity (e.g., a particular customer) such that the key terms demonstrated within the sample audio data relate to that subject, entity, or both. As noted above, using key terms related to a particular entity allows for customizing the acoustic model to a particular implementation, thereby improving the outputs of the acoustic model when applied to audio content from that entity When the key term data includes content demonstrating use of the key terms, S310 may further include extracting the key terms from such content and generating a list of key terms to be used by the clipping engine. The list of key terms may be generated, for example, using statistical processes based on the numbers of instances of different words or ordered combinations of words within the sample data. That is, words or combinations of words which appear with particularly high frequency within the sample data may be identified as key words. Further, a blacklist may be utilized to filter out potential key terms by ignoring words which are extremely common in non-subject specific dialogue. As a non-limiting example, terms appearing in the content above a threshold number or proportion of times may be identified as key terms, with or without blacklisting certain commonly used words (e.g., "a", "an", "the", etc.) from being identified as key terms based on a predetermined blacklist.

In some embodiments, S310 may further include sending the generated list of key terms to a user in order to receive feedback, and the list of key terms may be updated based on the feedback. As a non-limiting example, certain terms may be identified by the user as not actually key terms, and feedback indicating such is used to remove such terms from the list.

The target domain transcript data includes transcripts which are in a domain used by the acoustic model (i.e., a target domain to be used by the acoustic model). The target domain transcript data may be used in combination with the clips generated as described herein in order to tune the acoustic model to make accurate predictions with respect to key terms using audio data which may be of unknown domain. The entity-specific domain transcript data includes transcripts which are in a domain based on a set of keywords that is specific to a particular entity. In this regard, it is noted that some jargon is used more frequently at some organizations than at others, and some organizations may have their own unique jargon or other unique uses of words. Using such entity-specific domain data allows for further customizing the acoustic model to key terms which are more commonly used by a particular entity rather than key terms which are relevant to a subject more generally.

At S320, inputs for the clipping engine are generated using the acoustic model. More specifically, the inputs are generated at least by applying the acoustic model to features from the sample audio data. A non-limiting example process for generating the clipping engine inputs is described further below with respect to FIG. 4.

At S330, the sample audio data is clipped in order to generate a set of audio clips. The generated audio clips at least include key term audio clips containing audio including speaking of key terms. In an embodiment, the clipping is based on the inputs generated at S320.

In an embodiment, the inputs to the clipping model at S330 include at least the sample audio data to be clipped as well as inputs derived based on key term data. For example, such inputs derived based on key term data may include predictions output by a language model based at least one the key term data. In other words, such inputs include predictions of language for data including key terms.

At S340, the acoustic model is tuned using at least the clips. In an embodiment, S340 includes using the clips as inputs to an acoustic model trainer system configured to perform a machine learning algorithm with respect to the acoustic model, thereby custom training the acoustic model specifically with respect to the key terms represented in the key term clips. In a further embodiment, the inputs to the acoustic model trainer also include manual transcripts such as public transcripts, target domain transcripts, entity-specific domain transcripts, combinations thereof, and the like.

Figure 4:
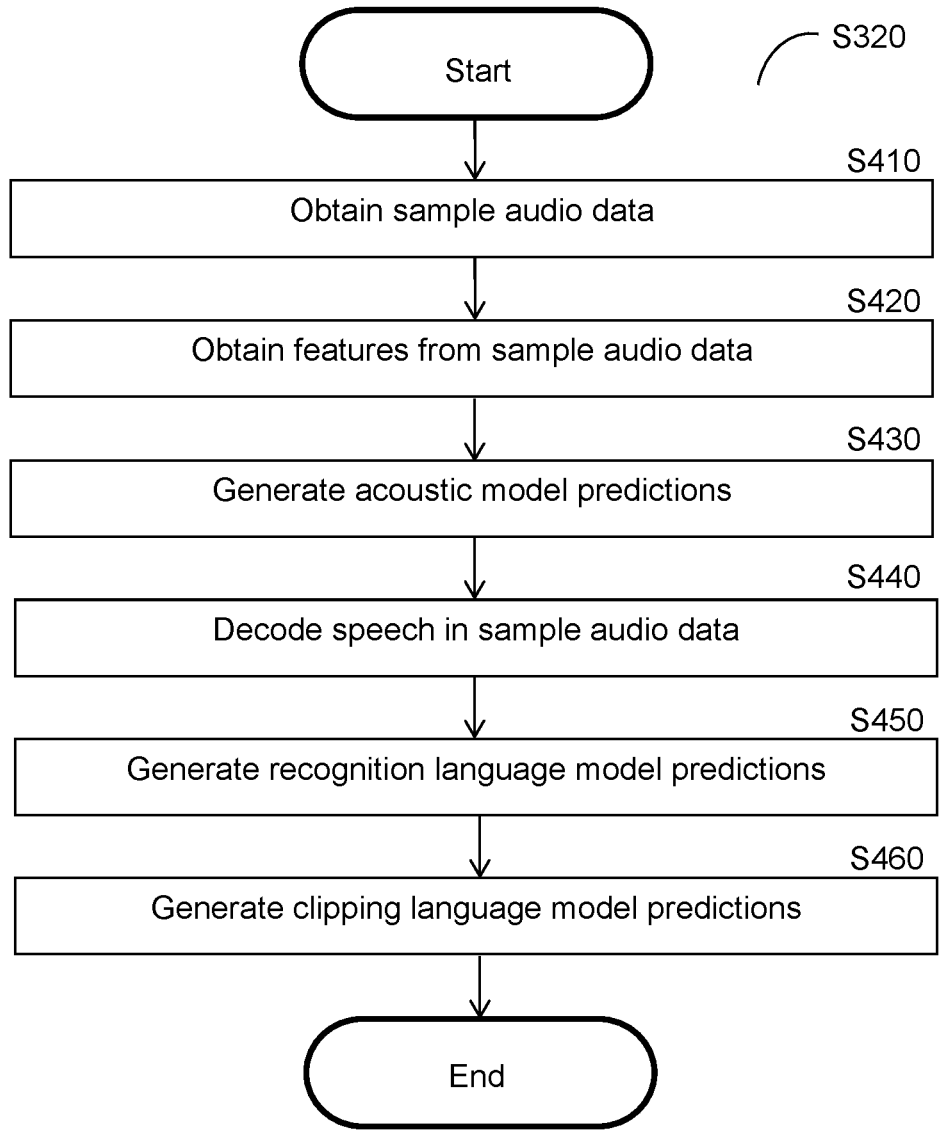
FIG. 4 is a flowchart illustrating a method for generating inputs for a clipping engine according to an embodiment.

FIG. 4 is a flowchart S320 illustrating a method for generating inputs for a clipping engine according to an embodiment.

At S410, sample audio data to be used for training the acoustic model is obtained. The sample audio data obtained at S410 may be, but is not limited to, the target domain sample data as discussed above with respect to S310.

At S420, training features are obtained from the sample audio data. The training features may be obtained by extracting, selecting, or otherwise deriving the features from among the sample audio data. In some embodiments, S420 may further include splitting the training audio data into different portions (e.g., into frames). The features may then be extracted from the split portions.

In an embodiment, S420 includes performing signal processing in order to transform raw audio waveforms into vectors which can be utilized by the clipping engine. Extracting the features may further include removing ambient noise or otherwise normalizing the waveforms. Non-limiting example featurization methods for extracting the features may be or may include calculating mel-frequency cepstral coefficients (MFCCs), performing perceptual linear prediction, or both.

At S430, acoustic model predictions are generated by applying the acoustic model to the features obtained at S420. During a first iteration of training, the acoustic model may have an initial configuration defined with weights for a certain domain (e.g., initially trained on public data which may be manually transcribed data or a combination of manually transcribed and untranscribed data). During subsequent iterations, the configuration of the acoustic model will have been tuned based on inputs to a trainer system from prior iterations.

At S440, the acoustic model predictions output by the acoustic model are input to a decoder in order to generate decoded text representing the words spoken as reflected by the acoustics recognized by the acoustic model in the sample audio data.

At optional S450, a recognition language model predictions is generated. The recognition language model predictions may be utilized as feedback to the decoder in order to improve the accuracy of the decoded text prior to subsequent processing.

Optionally, the recognition language model predictions scores together with acoustic model scores are used as inputs to the clipping engine.

At S460, a clipping language model predictions (e.g., scores) is generated to be used as inputs to the clipping engine (e.g. for rescoring of hypothesis). The clipping language model predictions are predictions for languages represented at least in key term data, and may further include predictions for the decoded text. The key term data includes examples demonstrating use of certain key terms in conversation and may be, but is not limited to, textual or other content (e.g., word processing documents, presentation program documents, etc.). In this way, the inputs to the clipping model include at least some language model predictions specific to the key terms, thereby allowing for more accurately clipping the key terms, which in turn allows for fine tuning the acoustic model using such clips to produce a suitably trained acoustic model with better performance (i.e., less errors in recognition).

Figure 5:
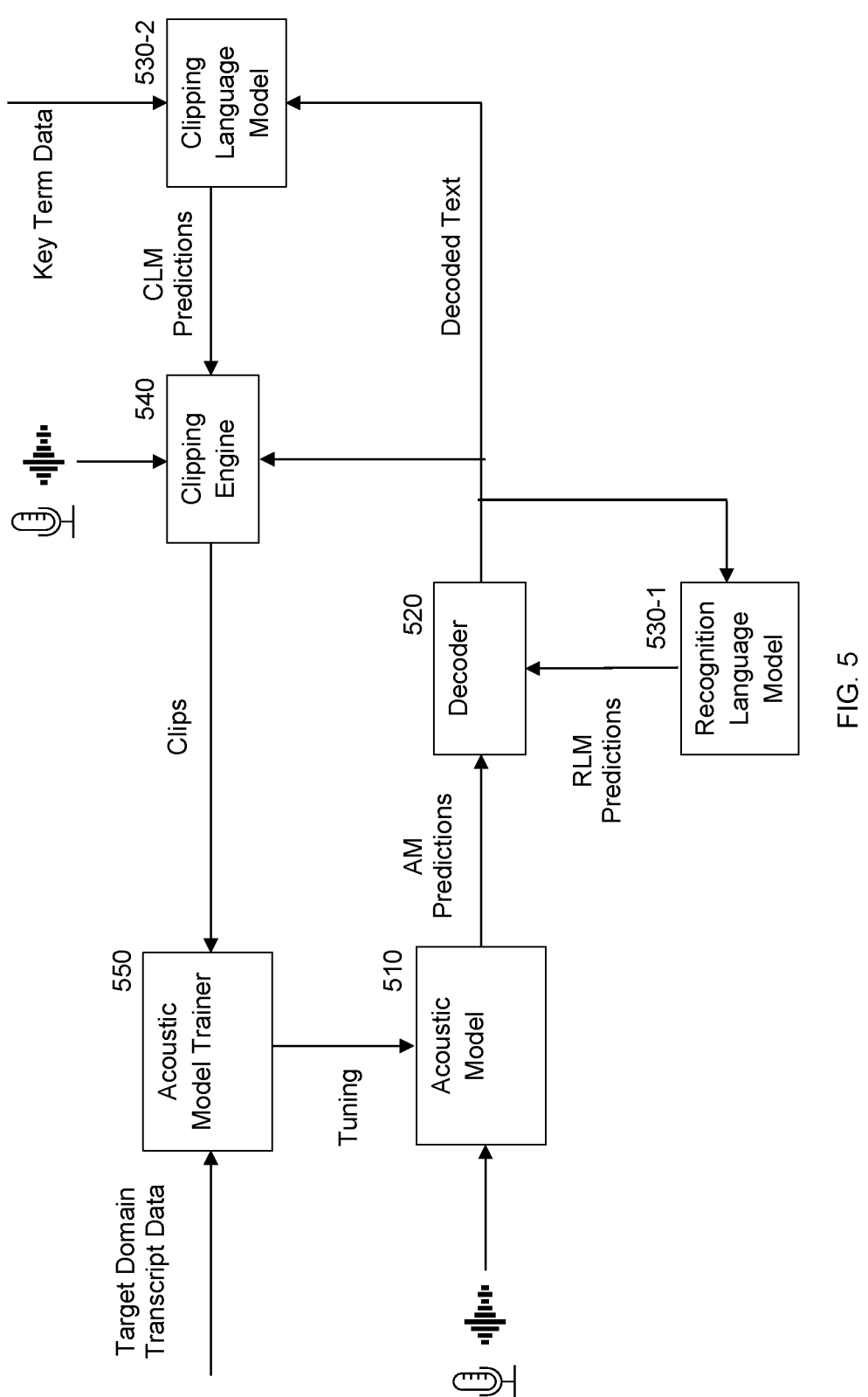
FIG. 5 is a flow diagram illustrating interactions among components for training an acoustic model in accordance with various disclosed embodiments.

FIG. 5 is a flow diagram 500 illustrating interactions among components to train an acoustic model in accordance with various disclosed embodiments. More specifically, FIG. 5 illustrates an example process for training an acoustic model by using a clipping engine to fine tune the acoustic model.

In FIG. 5, an acoustic model 510 utilizes sample audio content in order to output a set of acoustic model (AM) predictions. As a non-limiting example, the AM predictions are realized as a of a phoneme for each sound in the sample audio content. As a non-limiting example, sample audio content containing the word "benchmark" may yield phonemes "b", "e", "n", "ch", "m", "ar", and "k" as AM predictions. It should be noted that the predictions may be realized as individual phonemes for simplicity, or as probability vectors containing probabilities for different phonemes for each audio frame without departing from the scope of the disclosure.

The AM predictions are input to a decoder 520, which is configured to output decoded text based on the acoustics predicted by the acoustic model. The decoded text may be input to a recognition language model 530-1, which is configured to output a first set of recognition language model (LM) predictions used in decoding. The first set of recognition LM predictions may be fed to the decoder 520. The recognition language model 530-1 may be configured generally as to language and is not necessarily configured with subject-specific key terms.

The output of the decoder 520 may be, for example but not limited to, text, n-best predictions, lattice fst, and the like. The output of the decoder 520 is also input to a clipping language model 530-2 as well as to a clipping engine 540. The clipping language model 520-2 is also provided side information in the form of key term sample data. The key term sample data demonstrates use of key terms and may be, for example but is not limited to, content containing text with the key terms. The clipping language model 520-2 outputs a second set of clipping LM predictions to be input to the clipping engine 540.

In an example implementation, the clipping engine 540 is input the sample audio content which was input to the acoustic model 510, the AM predictions, the decoded text, the first set of recognition LM predictions, and the second set of clipping LM predictions. Using these inputs, the clipping engine 540 is configured to produce a set of audio clips from the sample audio content, where each clip includes audio of one or more respective key terms. As a non-limiting example, the clipping engine 540 may be configured with a list of key terms (not shown) including various business terms such as "benchmark", "KPI", "core competency", and the like such that the clips output by the clipping engine 540 include respective audio clips for the terms "benchmark", "KPI", and "core competency."

The clips are input to an acoustic model trainer 550 used for training the acoustic model 510 in order to tune the acoustic model 510. The acoustic model trainer 550 is configured to perform a machine learning algorithm to train the acoustic model 510, and may be further provided with target domain sample data. The target domain sample data includes values of a target domain, i.e., a set of potential values for a particular domain. The acoustic model 510 may be trained using this target domain sample data in order to adapt the acoustic model 510 for predicting acoustics for audio content of unknown quality, unknown domain, both, and the like.

FIG. 6 is an example schematic diagram of a hardware layer of an audio processor 130 according to an embodiment. The audio processor 130 includes a processing circuitry 610 coupled to a memory 620, a storage 630, and a network interface 640. In an embodiment, the components of the audio processor 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the audio processor 130 to communicate with, for example, the user device 120, the databases 140, both, and the like.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for efficiently training an acoustic model, comprising:

training an acoustic model over a plurality of training iterations by, at each of the plurality of training iterations:

applying the acoustic model to features extracted from training audio data in order to output a set of acoustic model predictions;

decoding, via a decoder, the training audio data based on the set of acoustic model predictions for the iteration in order to generate decoded text for the iteration, wherein the training audio data is clipped at each iteration based further on the decoded text for the iteration;

applying a language model to at least a set of key term sample data in order to output a set of language model predictions with respect to a plurality of key terms, wherein the key term sample data demonstrates use of the plurality of key terms;

clipping, via a clipping engine, the training audio data into a plurality of clips by inputting the decoded text based on the acoustic model output to the clipping engine and inputting the language model output to the clipping engine; and tuning the acoustic model via a machine learning algorithm using the plurality of clips.

2. The method of claim 1, wherein the set of language model predictions output at each iteration is a first set of language model predictions, further comprising at each of the plurality of training iterations:

generating a second set of language model predictions by applying the language model to the decoded text for the iteration; and providing the second set of language model predictions as feedback to the decoder.

3. The method of claim 1, further comprising:

applying the trained acoustic model to features of an audio data set in order to generate a plurality of acoustic predictions for the audio data set.

4. The method of claim 3, further comprising:

applying at least one speech recognition model to the plurality of acoustic predictions for the audio data set.

5. The method of claim 1, further comprising:

generating a list of key terms based on the key term sample data, wherein each key term among the list of key terms is a word or combination of words which appears in a plurality of audio samples above a threshold, wherein the language model is configured using the list of key terms.

6. The method of claim 1, wherein the acoustic model is tuned based further on target domain transcript data, wherein the target domain transcript data is in a target domain to be used by the acoustic model.

7. The method of claim 1, further comprising, at each of the plurality of training iterations:

extracting a plurality of features from the training audio data by performing signal processing on the training audio data in order to transform audio waveforms into vectors.

8. The method of claim 7, further comprising:

normalizing the audio waveforms, wherein the normalized audio waveforms are transformed into the vectors.

9. The method of claim 5, wherein the list of key terms is unique to a single entity.

10. A non-transitory computer readable medium having stored thereon instructions for causing a processing circuitry to execute a process, the process comprising:

training an acoustic model over a plurality of training iterations by, at each of the plurality of training iterations:

applying the acoustic model to features extracted from training audio data in order to output a set of acoustic model predictions;

decoding, via a decoder, the training audio data based on the set of acoustic model predictions for the iteration in order to generate decoded text for the iteration, wherein the training audio data is clipped at each iteration based further on the decoded text for the iteration;

applying a language model to at least a set of key term sample data in order to output a set of language model predictions with respect to a plurality of key terms, wherein the key term sample data demonstrates use of the plurality of key terms;

clipping, via a clipping engine, the training audio data into a plurality of clips by inputting the decoded text based on the acoustic model output to the clipping engine and inputting the language model output to the clipping engine; and tuning the acoustic model via a machine learning algorithm using the plurality of clips.

11. A system for efficiently training an acoustic model, comprising:

a processing circuitry; and a memory, the memory containing instructions that, when executed by the processing circuitry, configure the system to:

train an acoustic model over a plurality of training iterations wherein, at each of the plurality of training iterations, the system is configured to:

apply the acoustic model to features extracted from training audio data in order to output a set of acoustic model predictions;

decode, via a decoder, the training audio data based on the set of acoustic model predictions for the iteration in order to generate decoded text for the iteration, wherein the training audio data is clipped at each iteration based further on the decoded text for the iteration;

apply a language model to at least a set of key term sample data in order to output a set of language model predictions with respect to a plurality of key terms, wherein the key term sample data demonstrates use of the plurality of key terms;

clip, via a clipping engine, the training audio data into a plurality of clips by inputting the decoded text based on the acoustic model output to the clipping engine and the language model output to the clipping engine; and tune the acoustic model via a machine learning algorithm using the plurality of clips.

12. The system of claim 11, wherein the set of language model predictions output at each iteration is a first set of language model predictions, wherein the system is further configured to, at each of the plurality of training iterations:

generate a second set of language model predictions by applying the language model to the decoded text for the iteration; and provide the second set of language model predictions as feedback to the decoder.

13. The system of claim 11, wherein the system is further configured to:

apply the trained acoustic model to features of an audio data set in order to generate a plurality of acoustic predictions for the audio data set.

14. The system of claim 13, wherein the system is further configured to:

apply at least one speech recognition model to the plurality of acoustic predictions for the audio data set.

15. The system of claim 11, wherein the system is further configured to:

generate a list of key terms based on the key term sample data, wherein each key term among the list of key terms is a word or combination of words which appears in a plurality of audio samples above a threshold, wherein the language model is configured using the list of key terms.

16. The system of claim 11, wherein the acoustic model is tuned based further on target domain transcript data, wherein the target domain transcript data is in a target domain to be used by the acoustic model.

17. The system of claim 11, wherein the system is further configured to, at each of the plurality of training iterations:

extract a plurality of features from the training audio data by performing signal processing on the training audio data in order to transform audio waveforms into vectors.

18. The system of claim 17, wherein the system is further configured to:

normalize the audio waveforms, wherein the normalized audio waveforms are transformed into the vectors.

* * * * *